Feb. 22, 1938.    C. E. CARLL ET AL    2,109,365
CORN TRIMMING MACHINE
Filed Jan. 28, 1936    2 Sheets-Sheet 1
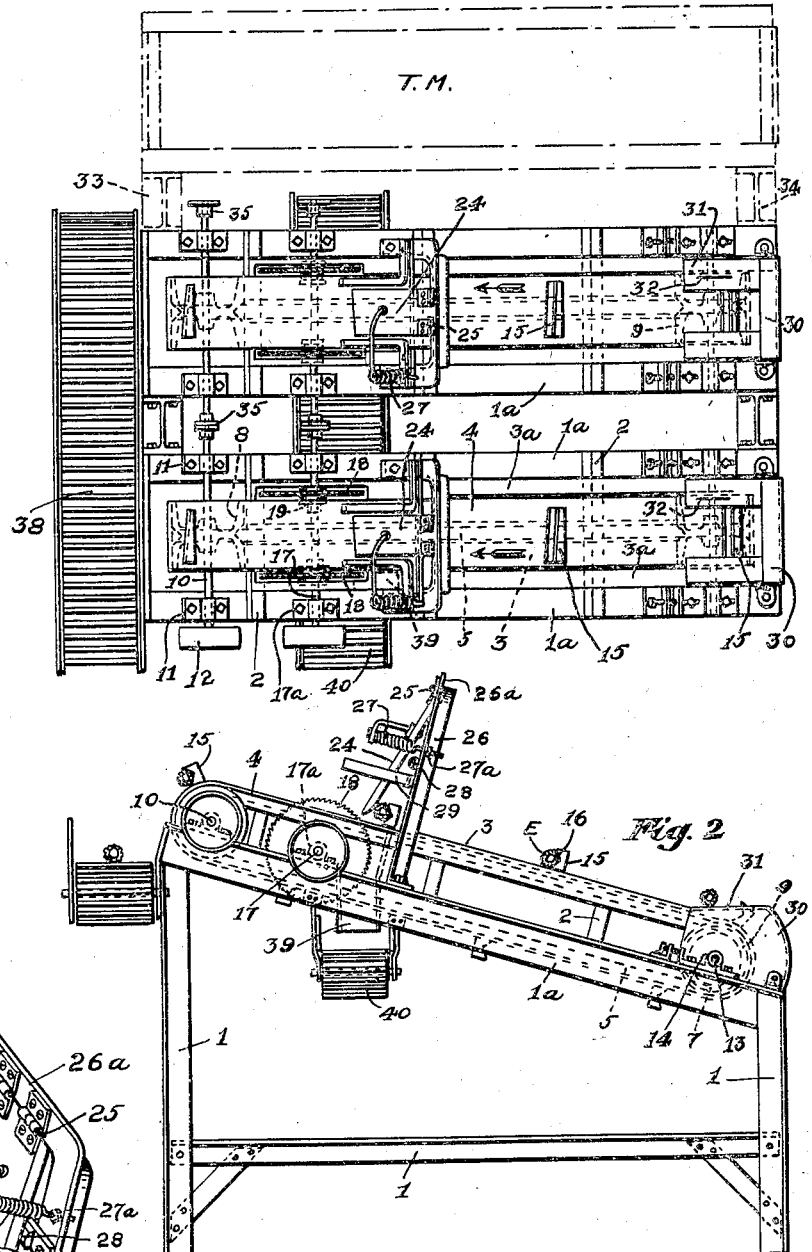
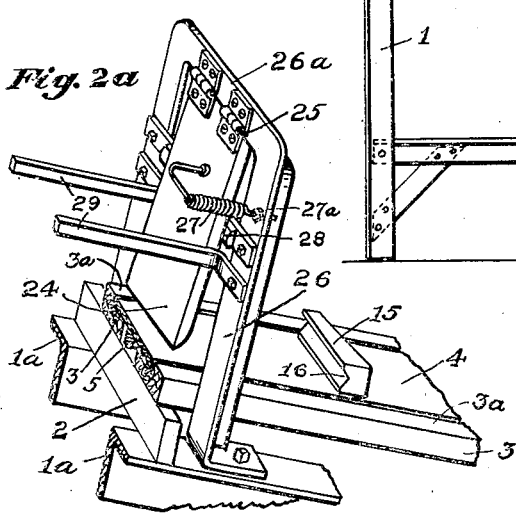
Inventors,
Clarence E. Carll
and
Willis G. Carll.
By Henry L. Chenery.
Atty.

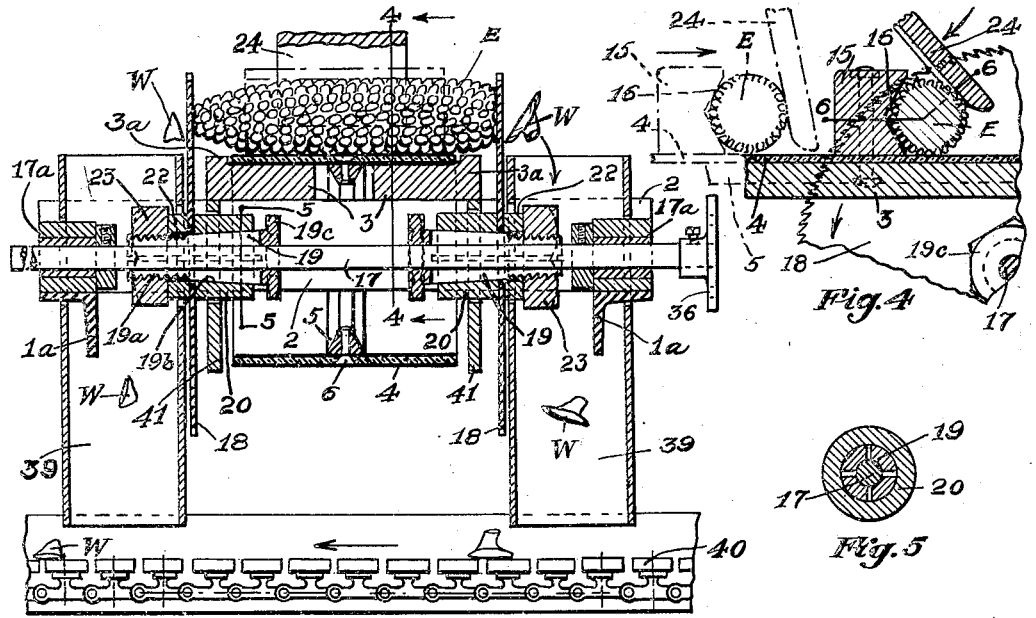

Patented Feb. 22, 1938

2,109,365

UNITED STATES PATENT OFFICE 2,109,365

CORN TRIMMING MACHINE

Clarence E. Carll and Willis G. Carll, Gorham, Maine

Application January 28, 1936, Serial No. 61,206

1 Claim. (Cl. 146—84)

The invention hereinafter to be described relates, in a general way, to apparatus adapted for use in the canning industry. Considered more specifically, it deals with structure for trimming the ends of ears of green corn which subsequently is to be packed and cooked in containers and marketed as a "corn-on-the-cob" canned food product.

The conventional method of canning corn, and one which is more generally used than any other by packers of this particular food, needs but the briefest description.

The husks and silk are detached from the ears, the edible portion—the kernels, stripped from the cobs, syrup added, and the shipping containers filled with the mixture. After sealing the cans in closing machines they are retorted until their contents is sufficiently cooked to prevent deterioration or spoilage thereafter.

In times past there has been an occasional attempt made to can corn on the cob, but various difficulties have presented themselves to those making the attempt and thus delayed accomplishment of a very desirable object. Corn eaten off the cob is the natural way, and with the proper appliances for handling the work, corn packed in this manner will be more and more in demand.

One of the difficulties encountered in canning corn on the cob has been cured by the use of the apparatus which is the subject of the present application.

It embodies a power-driven conveyor which carries the ears of corn, after being husked and silked, between two rapidly revolving saws, cutting off the butt or stalk end of the cob close to the kernels of corn.

The two saws are so spaced, relatively, that the ears are generally cut off on both ends, making the length of the ear after passing through the apparatus of the right dimension to stand vertically in the container in which the corn is to be packed. Manual handling of the ears in placing them on the feed conveyor is desirable if not quite essential, for none of the cob which has no kernels on it should be left on the ear, for this valueless portion would be utilizing space in the container which should be devoted to food only.

One advantage of our corn cob trimmer is that it can be used singly or in multiples, the saw-driving and belt conveyor shafts each have couplings and additional units as needed can be added.

Another advantage resides in the ability of the operator to adjust the two saws in each unit to various distances between them. Thus ears of corn can be cut on one unit of one length, the next unit cutting the corn to a different length, and the third still another length, and so on.

Various other objects and advantages will be dealt with as the description of the invention proceeds; and for a clearer understanding of the import of our invention reference should be had to the accompanying drawings in which,—

Fig. 1 is a plan view of the apparatus, two units being shown, with another outlined in dot and dash lines which might be added;

Fig. 2 is a side elevation of the trimming machine;

Fig. 2a is a fragmentary view of the apparatus, showing particularly the swinging arm which yieldingly engages the ears and holds them in the flights during the sawing operations;

Fig. 3 is a sectional view taken on the broken line 3—3, Fig. 2, showing the saws, adjustable saw collars and shaft;

Fig. 4 is a section taken on line 4—4, Fig. 3;

Fig. 5 is a section taken on line 5—5, Fig. 3;

Fig. 6 is a section taken on the broken line 6—6, Fig. 4;

Fig. 7 is a plan view of the feed end of the apparatus;

Fig. 8 is a section taken on line 8—8, Fig. 7, and

Fig. 9 is a section through one of the conveyor belt pulleys, the figure also showing the shaft and transmission pulley for driving the conveyor.

Similar reference characters are employed to identify like parts in all the different views of the drawings.

Referring to the drawings, 1 represents the elements, taken collectively, comprising the substructure of the apparatus, and 1a, 1a are the two inclined top rails upon which the operating parts are directly mounted.

Disposed on the members 1a transversely of the machine are cross-bars 2 upon which are mounted the longitudinal run-way members 3.

These run-way members 3 have slightly raised side portions 3a, forming a shallow trough in which travels the carrier belt 4 made preferably of rubber.

On the inner face of the belt 4 is secured a V-shape guide strip 5, the securing means being either rivets 6, as shown, or by vulcanizing the parts together.

This member 5 operates in the V-shape grooves 7 made on the periphery of the carrier drive pulley 8 and driven pulley 9, and functions to maintain the conveyor belt 4 on and in central alignment with the straight faces of the two pulleys.

The pulley 8 is fixed on a shaft 10 which operates in bearings 11, and a transmission pulley 12, receiving power from some prime mover or counter shaft (not shown), drives the shaft 10, pulley 8, and conveyor belt 4. The driven pulley 9 is mounted on a shaft 13 rotating in belt-tightening bearings 14.

Secured to and located at intervals along the conveyor belt 4 are a plurality of corn-carrying flights 15, in the forward face of each of which is cut an angular seat or depression 16 adapted to receive an ear of corn E as it is manually placed on the conveyor for delivery to the trimming end of the machine.

Toward the upper ends of the inclined top rails 1a is a shaft 17 rotating in bearings 17a. Mounted on this shaft are two saws 18, straddling the conveyor belt and spaced, relatively, a distance corresponding to the required length of the ears of corn to be trimmed.

Corn-on-the-cob product may be packed in various lengths of ears. In Fig. 3 are shown two adjustable saw-collar and sleeve combinations by means of which the two saws in each unit machine may be spaced at various distances apart.

The members 19 are tapering, split collets externally screw-threaded at 19a, one collet having right-hand and the other left-hand thread.

Over the tapered portions 19b of the collets are mounted, respectively, two taper-bored slidable collars 20, their outer ends thrusting on the saws 18, and serving as clamping means on one side of each saw.

On the opposite side of the saw is another collar 22 against which abuts the screw-threaded nut 23. This nut, when rotated so that it moves toward the larger end of the collet, causes the saw 18 to be rigidly clamped between the two collars and the collet itself to be constricted and firmly bound to the shaft 17, due to the movement, inwardly, of the collar 20 along the tapered surface 19b of the collet.

The head 19c of the collet member is preferably made hexagonal or square shape in order that a wrench may be used to hold the collet against turning movement while the nut 23 is being rotated.

By loosening the nut 23 and lightly tapping the collar 20 with a hammer to force it toward the small end of the tapered portion of the collet, the latter will relax its grip on the shaft 17 and may then be placed in any other location on the saw shaft, depending on the distance it is desired to place the two saws apart. Either one or both the collet combinations may be moved in re-adjusting the saws.

As the ears of corn lodged in the angular depressions 16 of the respective flights are being carried along the conveying apparatus toward the saws, they come, consecutively, into engagement with a depending arm 24, hinged at 25 to and suspended from the cross-wise portion 26a of the yoke frame structure 26.

The object of the swinging arm 24 is to yieldingly hold the ear of corn in the depression in the flight while the cob-sawing operation is taking place. Otherwise, upon the ear making contact with the high-speed-driven saws it might and most likely would be precipitately hurled from its position in the flight.

As ears of corn are usually slightly tapering, the corn-contacting surfaces of the seat 16 and the inner or under face of the swinging arm 24 are, relatively, out of parallel and made to converge from the corn butt-supporting end of the flight at an included angle substantially that of the average ear of corn. This construction gives a much more even and full-length contact of the ear-clamping parts than would parallel surfaces, and with less likelihood of marring or bruising the kernels of corn on the cob.

A spring 27 maintains a slight tensional pressure of the arm 24 on the ear of corn E, the pressure being capable of increase or decrease by manipulation of the nut 27a operating on the straight shank of the spring.

A rubber bumper 28, serving to limit the backward movement of the arm 24, also lessens the shock and noise of the returning arm after each ear of corn has passed beneath it. The guide bars 29 hold the arm against lateral movement as it swings forwardly and backwardly.

A metal guard 30 encloses the lower end of the conveyor and a sheet rubber apron 31, attached at its rearward edge to the guard, provides a very convenient supporting and locating shelf for the ears of corn as they are manually fed to the conveyor and picked up by the next approaching flight in its passage toward the saws.

A gauge mark 32 is placed on the apron in alignment with the right hand saw, or the one which operates on the butt end of the ear of corn, and this materially assists in correctly locating the ear, transversely of the conveyor, so that the saw cut will come at the most advantageous point adjacent its larger end. Ordinarily this point is close to the kernels of corn, in which instance there is no waste of the edible portion of the ear.

Tie brackets 33 and 34 join adjacent unit trimming machines, additional units being added as desired, as suggested by the dot and dash line outline of a trimming machine, TM, in Fig. 1. A line of these machines can, therefore, be installed and the moving elements in all derive power for operating from a common source. To illustrate, the conveyor drive shafts 10 are interconnected by couplings 35 and all driven by the pulley 12; the saw shafts or arbors 17 are united by couplings 36 and driven, as a unit, by the pulley 37. The pulleys, of course, may be replaced by other transmission elements, as direct motor drive with geared reduction for the conveyors.

As the ears of corn, trimmed to the correct lengths, pass off the conveyor or carrier belt 4, they drop on to the line conveyor 38 which delivers them to the filling benches (not shown), at which time the ears are placed in marketing containers, usually four ears to a container.

The waste which is trimmed from the ends of the ears of corn is supposed to fall through chutes 39 on to the waste line conveyor 40 and carried to any desired place of disposal. Occasionally, however, in the operation of the trimmers, one, and sometimes more of the waste end pieces W cut from the cob will fail to enter the chute and pass down on to the lower course of conveyor belt 4, and traveling with the belt will become jammed between it and the lower conveyor pulley 9.

To eliminate any possible chance of the foregoing occurring there are placed at the sides and beneath the members 3 of the run-way side boards 41, closing the space abreast of the opening between the two courses of conveyor belt.

In factories and canneries where unskilled labor is largely employed it is very essential that every reasonable precautionary measure be adopted to guard and protect the life and limb of the workers. For instance, where machines using circular saws operating at speeds from three to four thousand revolutions per minute, as do those in the present invention, the possibility of personal injury to the worker is always present and machines of this class are, therefore, usually prolific sources of accidents.

We have, however, anticipated all this in the design of our corn-cob trimming machine, placing the saws out of reach of the worker when operating the apparatus, giving first consideration to the safety of the machine tender, made the structure as simple as possible, combining manual with automatic feeding of the corn to the trimming elements, and in general endeavored to construct a machine capable of fulfilling all the requirements called for in one of this class.

What we claim is:

Apparatus for trimming ears of corn to predetermined lengths for packing in marketing containers, comprising a supporting frame, a conveyor adapted to carry ears of corn from one end to the opposite end of said apparatus, said conveyor embodying two pulleys disposed, respectively, at the two ends of said apparatus, a central V-shape circumferential groove in the rim of each of said pulleys, an endless belt operating over said pulleys, a continuous V-shape guide strip secured to and disposed on the inner face of said endless belt, adapted to travel in said grooves and hold the belt in central, longitudinal alignment with said pulleys, two circular saws mounted on said supporting frame, disposed, respectively, adjacent the sides of said conveyor and between said pulleys, means to space said saws, relatively, at various distances whereby the ears of corn may be trimmed to various, predetermined lengths, a plurality of corn-engaging flights secured to and arranged along said endless belt, the forward faces of said flights having corn-receiving depressions set at a slightly oblique angle with respect to a right line transversely of said conveyor, and a swinging arm mounted above and between said saws having a face of opposite obliquity to that face of the flight in which is the said depression, said arm adapted to engage one side of the ear of corn while the opposite side is being held in the depression in the adjacent flight during the saw-cutting operation.

CLARENCE E. CARLL.
WILLIS G. CARLL.